United States Patent [19]
Santilli et al.

[11] Patent Number: 5,821,982
[45] Date of Patent: Oct. 13, 1998

[54] METHOD AND DEVICE FOR SECURELY TRANSMITTING TELETEXT PAGES TO SPECIFIC USERS

[75] Inventors: Daniele Santilli; Herman J. R. Schmitz, both of Eindhoven, Netherlands

[73] Assignee: U.S. Philips Corporation, New York, N.Y.

[21] Appl. No.: 657,472

[22] Filed: May 29, 1996

[30] Foreign Application Priority Data

May 31, 1995 [EP] European Pat. Off. ................ 9520149

[51] Int. Cl.⁶ .................................................. H04N 7/14
[52] U.S. Cl. ............................ 348/13; 348/468; 348/552; 348/563
[58] Field of Search ................. 348/5.5, 6, 7, 10, 348/12, 13, 461, 467, 468, 473, 476, 478, 552, 563, 906, 553; 455/3.1, 5.1, 4.2, 6.1, 6.2, 6.3; H04N 5/445, 7/025, 7/03, 7/035, 7/08, 7/00, 7/088, 7/14, 7/16, 7/173, 7/167

[56] References Cited

U.S. PATENT DOCUMENTS 4,538,174  8/1985  Gargini et al. ........................ 348/10 X
5,337,155  8/1994  Cornelis ................................. 348/473

FOREIGN PATENT DOCUMENTS 0401873  12/1990  European Pat. Off. ....... H04N 7/087

Primary Examiner—Nathan J. Flynn
Attorney, Agent, or Firm—Leroy Eason

[57] ABSTRACT

In interactive teletext, an individual user establishes a connection (6) with a central computer (14). Requested information is applied to a television transmitter (12) via a teltext inserter (11) and transmitted to the user as personal teletext pages for display on the user's receiver (3). However, other users (4) may be "co-viewers". In accordance with the invention, each personal page is transmitted with a teletext page number P and a sub-code S. Subsequently, a pseudo-page having the same page number P but a different sub-code S' is transmitted. Consequently, the personal page appears on the display screen of the co-viewer's receiver (4) only for a short time.

10 Claims, 2 Drawing Sheets

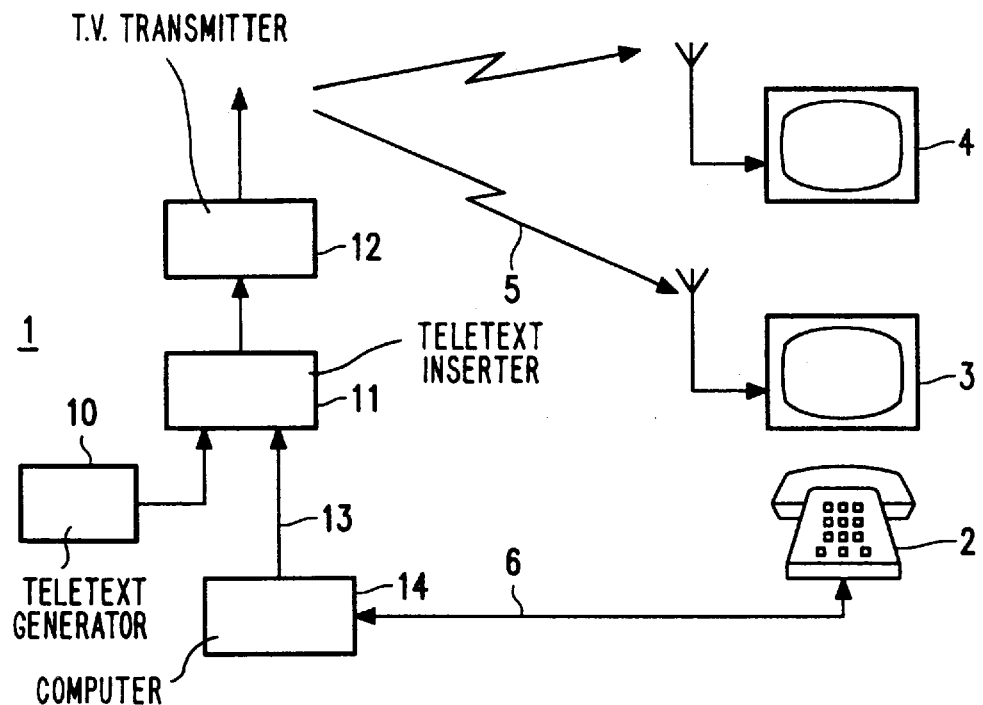
FIG. 1
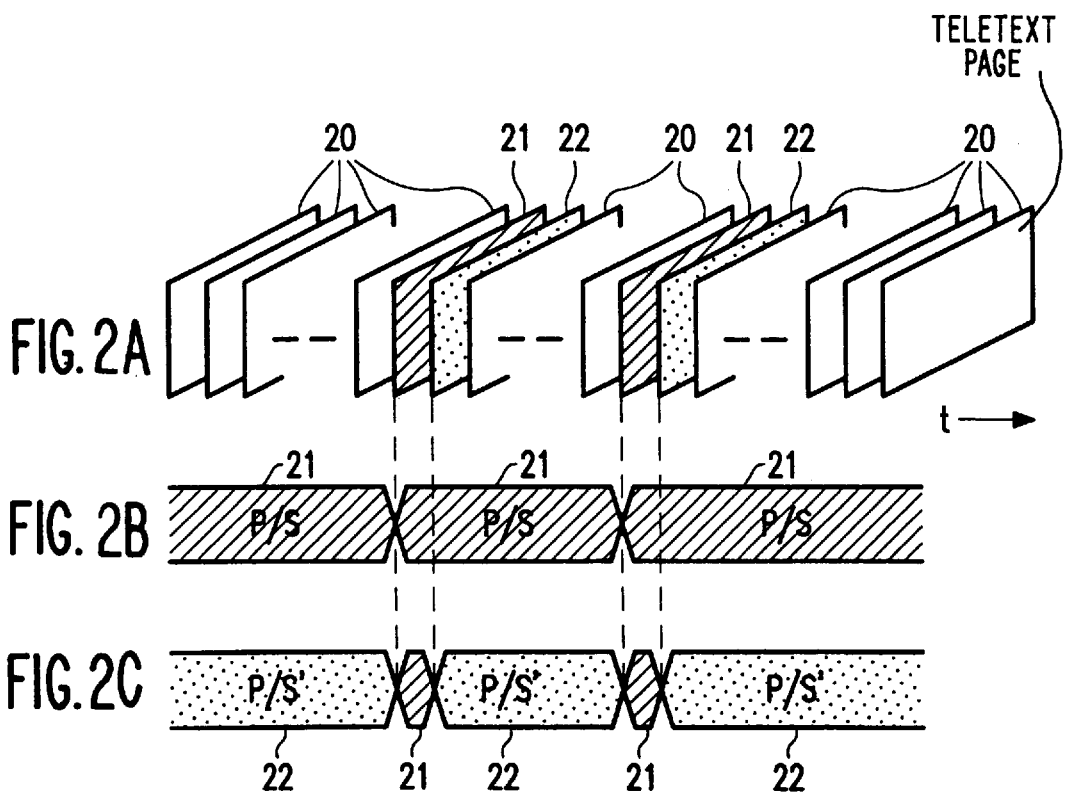

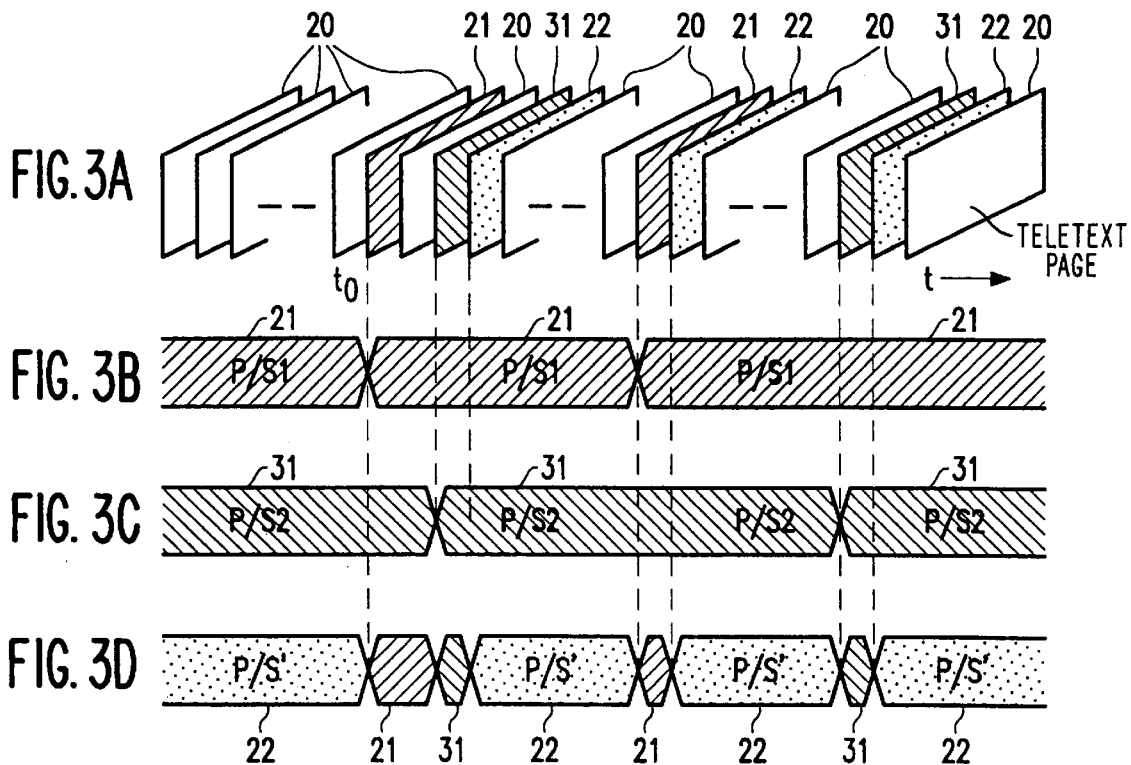
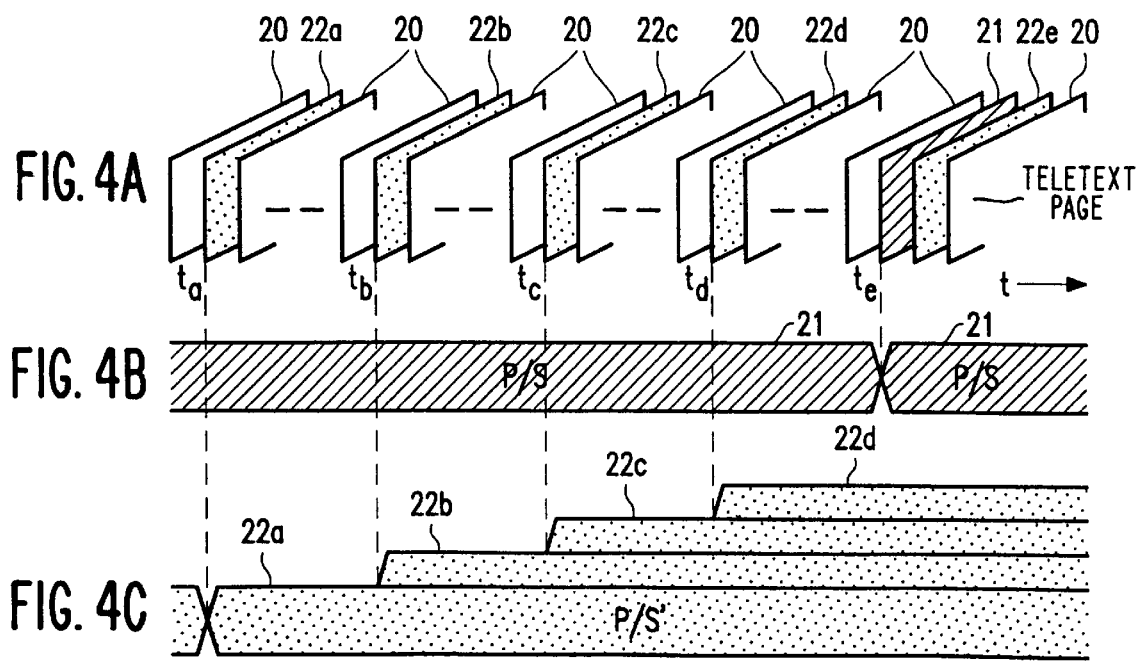

METHOD AND DEVICE FOR SECURELY TRANSMITTING TELETEXT PAGES TO SPECIFIC USERS

BACKGROUND OF THE INVENTION

1. Field Of The Invention

The invention relates to a method of transmitting a teletext page to an individual receiver via a transmission medium, comprising the steps of generating the teletext page to be transmitted, assigning a page number to the page, transmitting said number to the receiver via a second transmission medium, and transmitting the teletext page having the assigned page number.

2. Description Of The Related Art

The known method described in the opening paragraph is also referred to as interactive teletext. As is known, in teletext a plurality of information pages is transmitted by a transmitter in the television signal picture lines which are not used for video transmission. The teletext pages are open to everyone. The information is often accessible by means of a structure of menu pages.

Teletext was originally intended as a one-way transmission system. However, in interactive teletext, a user establishes a connection with a computer via a second transmission medium (often a telephone connection). This computer informs the user of a personal teletext page number and requests him to enter this number on his hand-held remote control unit. The television receiver is then tuned to a predetermined television transmitter and is in the teletext mode. Subsequently, a two-way connection is established. The user requests data (or plays a game) by means of the telephone keys. The response thereto is transmitted in the form of a teletext page with the personal page number by the transmitter and displayed on the receiver.

In the known method, other users may be "co-viewers". They can tune to the transmitter and try to trace the personal page number of an interactively operating user. Since the page number has a limited range (100–899), and since page numbers of the generally accessible teletext pages are already known, it is not so difficult to trace such a page number. Moreover, there are television receivers which automatically keep track of teletext pages which are being transmitted, and display them in an ascending order of page numbers in response to a "next" command. With such receivers, there is a great risk that the "personal" teletext page appears on the display screen of a "co-viewer".

As long as the use of interactive teletext is limited to playing a game, this is no practical drawback. However, an application of interactive teletext which is considered to be important is the request for personal information from a data file.

SUMMARY OF THE INVENTION

It is an object of the invention to reduce the possibility of unwanted co-viewing.

In accordance with the invention, the method therefore comprises the steps of: assigning a sub-code associated with the teletext page number, transmitting said sub-code to the receiver via the second transmission medium and transmitting at least one further teletext page having the same page number and a sub-code different from said subcode.

The user now enters both the personal page number and said sub-code on the remote control unit. The relevant user's television receiver thereupon displays the corresponding teletext page in further known manner. However, if other users have traced the page number, all pages having that number are displayed on their receiver, hence also the at least one further page. The effect is that the personal page is only displayed until the further page is received. The time can be rendered arbitrarily short by the transmitter, even so short that the personal page is visible for only a fraction of a second. The co-viewers can only watch undisturbed if they know both the three-digit page number and the (four-digit) sub-code of the personal page. The risk that they know these numbers is considerably reduced because they now have to trace a seven-digit number.

Some extra transmission capacity is necessary for transmitting the further teletext page. The overhead therefor is extremely small in an embodiment of the method in which the further teletext page is constituted by a page header incorporating the page number. The transmission of such a page header is sufficient to fully erase a displayed teletext page in the receiver. The transmission of the further page takes only one television picture line.

The overhead is even nil in an embodiment in which the further teletext page is constituted by a teletext page intended for a further individual receiver. If many users are interactive simultaneously, the receiver of a co-viewer displays all pages. This results in an unpleasant flashing of the displayed picture.

In a further embodiment, a plurality of further pages is transmitted with the same page number and arbitrarily different sub-codes. Such an embodiment is effective in the case where the co-viewer's receiver is of a type displaying the first-received version of a rotating teletext page and stores some subsequent versions in a memory for display at a later stage.

These and other aspects of the invention will be apparent from and elucidated with reference to the embodiments described hereinafter.

BRIEF DESCRIPTION OF THE DRAWINGS

For a fuller understanding of the invention, reference is had to follow description taken in connection with the following drawings, in which:

FIG. 1 shows a system to explain the method according to the invention.

FIGS. 2, 3 and 4 show some time diagrams to explain the operation of the system shown in FIG. 1.

DETAILED DESCRIPTION OF THE PREFERRED EMBODIMENTS

FIG. 1 shows a system to explain the method according to the invention. The system comprises a device 1 at the transmitter end. A conventional telephone set 2 and a conventional television receiver 3 provided with a teletext decoder are present at the user's end. The reference numeral 4 denotes a co-viewer's television receiver.

The device 1 at the transmitter end comprises a teletext generator 10 for generating and storing the "regular" teletext pages (i.e. pages accessible to everyone). The teletext pages are applied to a teletext inserter 11 and transmitted by a television transmitter 12. A computer 14 is connected to the teletext inserter 11 by means of a connection 13. The connection 13 may be a local connection. Computer 14 may, however, also be present at a completely different location than the rest of the device. In that case, connection 13 is, for example a rented data line. The television transmitter 12 transmits a television signal via a transmission medium 5. The computer 14 is coupled to a telephone network 6.

The system shown in FIG. 1 operates as follows. By means of the handheld remote control unit (not shown), a user tunes his television receiver 3 to television transmitter 12 and activates the teletext mode. One of the regular teletext pages invites him to call a given telephone number, for example, to play a game or consult a data file. The connection is then established with the computer 14 via the telephone 2. By means of synthetic speech, the computer informs the user via the telephone connection of a page number P and a sub-code S and requests him to select the teletext page having that page number and sub-code by means of the remote control unit. Subsequently, the remote control unit is no longer necessary. Selection of a teletext page with a sub-code is generally known per se.

The computer 14 generates a personal teletext page with page number P and sub-code S and applies it to the teletext inserter 11 via connection 13. Subsequently, the personal page is transmitted, in principle once, in further known manner. The teletext page is one of the many other pages transmitted by the transmitter and can in principle be received and displayed by all receivers, such as receiver 4. However, other users are ignorant of the presence of this page. This ignorance can be intensified by activating the "out-of-sequence" control bit in the page header of the personal page.

The computer 14 is adapted to add a further teletext page to the transmission cycle after transmission of the personal teletext page with number P and sub-code S. The further page has the same page number P as the personal page, but a different sub-code S'. Sub-code S' may be completely arbitrary. The only condition is that S' should be unequal to S. The further page with sub-code S' will hereinafter be referred to as pseudo-page.

The further communication between the user and computer 14 takes place via the keys of the telephone set 2. With these keys, the user makes a choice from the possibilities presented on the personal teletext page. After each choice, the contents of the personal page are updated by the computer 14, applied to the teletext inserter 11, transmitted by the transmitter 12 and displayed on receiver 3. Each update of the page is followed after a short time by the transmission of the pseudo-page with page number P and sub-code S'.

The method will now be further described with reference to some time diagrams shown in FIG. 2. The reference A shows diagrammatically an example of the teletext pages transmitted as a function of time by the transmitter. The reference numeral 20 denotes the regular teletext pages intended for general consultation. These pages have a page number which is unequal to P. Some transmissions of the personal teletext page with page number P and sub-code S are denoted by the reference numeral 21. The subsequent transmissions of the pseudo-page with page number P and sub-code S' are denoted by the reference numeral 22. The reference B in the Figure shows which teletext page is displayed on the display screen of television receiver 3 (see FIG. 1). It will be evident that this receiver only displays the pages 21 which indeed have page number P and sub-code S. The reference C in the Figure shows which pages are displayed on the display screen of the receiver 4 (see FIG. 1) of a "co-viewer", assuming that he has been able to trace the page number P and has entered this number. As is apparent from the Figure, each version of the personal page 21 on this receiver is always erased after a short time and overwritten when the subsequent pseudo-page 22 is received. Preferably, the transmission of personal page 21 is followed immediately by the transmission of the pseudo-page 22. The personal page then only appears on the display screen for a fraction of a second.

The pseudo-page may be a full teletext page having completely arbitrary contents. "Full" is herein understood to mean that all rows of the page are actually transmitted in order that all rows of the personal page are overwritten in receiver 4 (see FIG. 1).

The pseudo-page does not even have to contain any further text rows if the reception of a page header is sufficient to erase a displayed page. In the World System Teletext system, which is used practically worldwide, said erasing action is performed if the "erase page" control bit is activated in the page header of the pseudo-page.

The "out-of-sequence" control bit is also preferably activated in the page header of both the personal pages 21 and the pseudo-pages 22. This prevents the display of the page number P on the display screen during the search for a requested page and thus reduces the risk of tracing page number P.

FIG. 3 shows a second example in which a plurality of interactive users is supposed to be active. The reference numerals 21 and 31 denote, at A, the personal pages for two different users. These pages have the same page number P but different sub-codes S1 and S2. The reference numeral 22 again denotes a pseudo-page with page number P and sub-code S'. The Figure shows at B and C which teletext page is displayed on the display screen of the television receiver of the first and the second user, respectively. The Figure shows at D which pages are displayed on the display screen of a "co-viewing" receiver. As has been attempted to show in the Figure, transmission of the pseudo-page after the personal page 21 may be dispensed with at the time $t=t_0$, because it is followed after this short time by a transmission of the personal page 31 for the other user. Page 31 for the second user functions, as it were, as the pseudo-page for the personal page 21.

Nowadays, some television receivers are of a type displaying the first-received version of a rotating teletext page and storing a plurality of subsequent versions in a memory for display at a later stage. In order to reduce the risk of co-viewing a personal teletext page also in such receivers, the device transmits a plurality of pseudo-pages, for example twenty empty pages per second. All pseudo-pages have a different and completely arbitrary sub-code S'.

FIG. 4 shows some time diagrams to illustrate this embodiment. The transmitted teletext pages are shown as a function of time at A again. The transmission comprises regular pages 20 with a page number which is unequal to P, a personal page 21 with page number P and sub-code S and a plurality of pseudo-pages 22a, 22b, 22c, . . . with page number P and random sub-codes S'≠S. It has been indicated at B that page P with sub-code S is displayed on the display screen of television receiver 3 (see FIG. 1). It has been attempted to show, at C, the response of a co-viewing television receiver 4 (see FIG. 1) with a background memory for three pages. It has been assumed that the user has requested page P shortly before the transmission of pseudo-page 21a at the time $t=t_a$. Upon reception, the relevant page 22a is displayed after which it stays on the display screen. Upon reception, the three further pages 22b, 22c and 22d are stored in a background memory. They do not appear on the display screen until after the user has generated an appropriate operating command. It will be evident that, due to the multitude of pseudo-pages, there is a small risk that the personal page 21 appears on the display screen.

It is to be noted that it is possible to combine the method according to the invention with the prior-art method. For example, a first type of information, for example games, can be transmitted to users via teletext pages having different page numbers at which the sub-code does not play a role. More confidential information is transmitted to the users via teletext pages with the same page number and different sub-codes.

The invention can be summarized as follows. In interactive teletext in, an individual user establishes a connection with a central computer. Requested information is applied to a television transmitter via a teletext inserter and transmitted to the user as personal teletext pages for display on the user's receiver. However, other users may be "co-viewers".

In accordance with the invention, each personal page is transmitted with a teletext page number P and a sub-code S. Subsequently, a pseudo-page having the same page number P but a different sub code S' is transmitted. Consequently, the personal page appears on the display screen of the co-viewer's receiver only for a short time.

We claim:

1. A method of transmitting a teletext page to an individual receiver via a transmission medium, comprising the steps of generating the teletext page to be transmitted, assigning a page number to the page, transmitting said number to the receiver via a second transmission medium, and transmitting the teletext page having the assigned page number, characterized in that the method comprises the steps of:

assigning a sub-code associated with the teletext page number, transmitting said sub-code to the receiver via the second transmission medium, and transmitting at least one further teletext page having the same page number and a sub-code different from said sub-code, wherein the further teletext page is transmitted after transmission of the teletext page having the assigned page number, within a predetermined period of time.

2. A method as claimed in claim 1, wherein the further teletext page is constituted by a page header accommodating the page number.

3. A method as claimed in claim 1, wherein the further teletext page is constituted by a teletext page intended for a further individual receiver.

4. A method as claimed in claim 1, wherein a plurality of further pages having the same page number and arbitrary different sub-codes is transmitted.

5. A device for transmitting a teletext page to an individual receiver via a transmission medium, comprising:

control means for
generating the teletext page to be transmitted,
assigning a page number to the page and
transmitting said number to the receiver via a second transmission medium, and a transmitter for transmitting the teletext page having the assigned page number, characterized in that the control means are further adapted to
assign a sub-code associated with the teletext page number,
transmit said sub-code to the receiver via the second transmission medium and
transmit at least one further teletext page having the same page number and a sub-code different from said sub-code after transmission of the teletext page having the assigned page number. within a predetermined period of time.

6. A device as claimed in claim 3, wherein the further teletext page is constituted by a page header accommodating the page number.

7. A device as claimed in claim 3. wherein the further teletext page is constituted by a teletext page intended for a further individual receiver.

8. A device as claimed in claim 3, wherein the control means are adapted to transmit a plurality of further pages having the same page number and arbitrary different sub-codes.

9. A method of transmitting a teletext page as claimed in claim 1, wherein the predetermined period of time is less than one second.

10. A device for transmitting a teletext page as claimed in claim 3, wherein the predetermined period of time is less than one second.

* * * * *